(No Model.)
T. LINKE & H. E. GOULD.
COMBINED FAUCET AND FILTER.
No. 554,281. Patented Feb. 11, 1896.
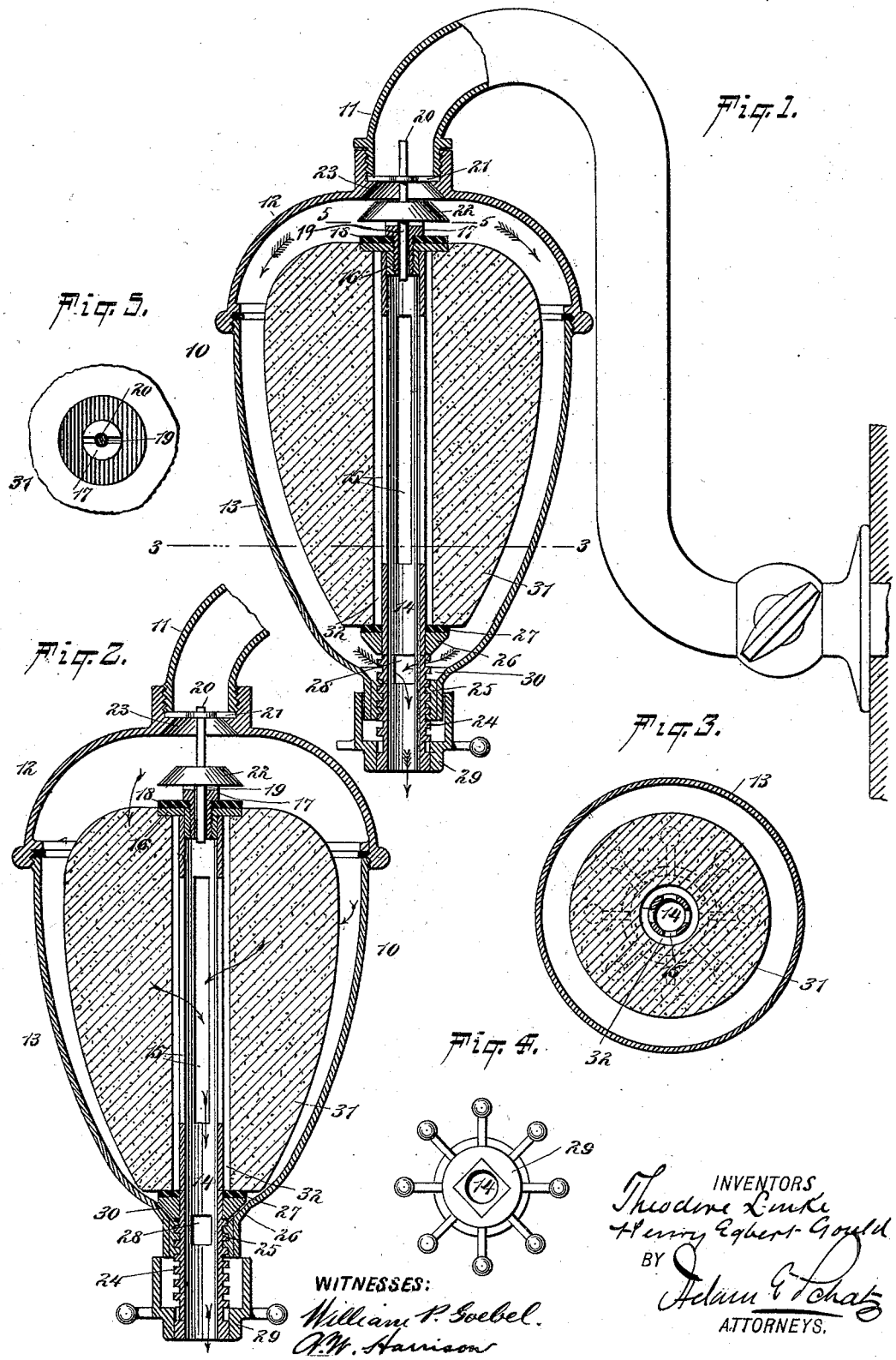
WITNESSES:
William P. Goebel.
A. W. Harrison
INVENTORS
Theodore Linke
Henry Egbert Gould
BY
Adam G. Schatz
ATTORNEYS.

UNITED STATES PATENT OFFICE.

THEODORE LINKE AND HENRY EGBERT GOULD, OF NEW YORK, N. Y.; SAID GOULD ASSIGNOR TO ANNIE LINKE, OF SAME PLACE.

COMBINED FAUCET AND FILTER.

SPECIFICATION forming part of Letters Patent No. 554,281, dated February 11, 1896.

Application filed May 16, 1895. Serial No. 549,515. (No model.)

*To all whom it may concern:*

Be it known that we, THEODORE LINKE and HENRY EGBERT GOULD, citizens of the United States, and residents of New York, in the county of New York and State of New York, have invented a certain new and useful Combined Faucet and Filter, of which the following is a specification.

Our invention relates to that class of filters in which the water is passed through artificial or natural stone filtering medium, which is incased within a glass or metal bulb or allowed to pass through and out of the bulb without passing through the filtering medium in order to obtain large quantities of unfiltered water. In filters of this type it has been customary to provide separate outlets from the bulb or casing for the filtered and unfiltered water; and the object of this present invention is to provide a filter which will supply either from a single outlet or cock.

A further object is to provide a filter which will be simple, inexpensive, and durable, and which may be cleansed without the possibility of any sediment or foreign matter of any kind remaining in the casing.

To these ends our invention consists in the construction and combination of parts, substantially as hereinafter described and claimed.

In the accompanying drawings, Figure 1 is a central vertical section of a filter embodying our improvements, said filter being represented as attached to a goose-neck faucet and the valves being in position to deliver unfiltered water. Fig. 2 is a similar view, but with the valves in position to deliver filtered water. Fig. 3 is a section on line 3 3 of Fig. 1. Fig. 4 is a detail under plan view of the lower end of the water-passage and the wheel for controlling the flow. Fig. 5 is a detail section on line 5 5 of Fig. 1.

In all the views the same reference-numerals are used to designate the same parts.

The cup, bulb, or casing 10 is shown as attached to a goose-neck faucet 11, and is composed of two parts or sections, 12 and 13, of glass or metal, screwed together with an intervening packing. The tube 14, having perforations or slots 15, is provided at its upper end with a permanently-secured internally-threaded ferrule 16, to which is fitted the screw 17, having a central vertical hole. Suitable packing 18 is interposed between the head of this screw and a metallic washer which rests on the top of the tube and is of a diameter considerably greater than that of the tube. A valve 22 adapted to fit the valve-seat 23, formed in the upper section 12 of the casing, is provided with a pin 19 fitting the hole in the screw 17 and with a pin 20 adapted to pass freely through a hole in a cross-bar 21.

The lower end of the tube 14 is threaded, as at 24, and fits the internally-threaded ferrule 25 which is secured in the lower end of the section 13 of the casing. Just above the threads 24 a valve 26 is secured to the tube and is adapted to fit the seat 30 formed in the section 13 above the ferrule 25, while one or more holes 28 are formed in the tube 14 below said valve. A hand-wheel 29 is secured to the lower end of the tube.

The filtering medium, which is preferably of natural or artificial stone 31, is somewhat acorn-shaped and has a central vertical opening to receive the pipe 14, which opening is preferably of a size so as to leave a slight space around said tube, as at 32. This stone rests on the packing 27 above the valve 26 and is clamped in place by the screw 17 through the medium of the metallic washer under the packing 18.

When no water is to flow the tube 14 will be turned by the wheel 29 until the valve 22 is closed against the seat 23, and when unfiltered water in large quantities is desired the hand-wheel will be turned so as to open the valve 22 and yet not close the valve 26, as shown in Fig. 1. The water will now flow around the filter, through the hole or holes 28 and out through the lower end of the tube which forms the nozzle. This will thoroughly cleanse the stone by washing off from it any impurities deposited thereon, and this cleansing is facilitated by the acorn shape of the stone, all portions of its surface being rounded.

When filtered water is desired, the tube will be turned until the lower valve 26 is closed, as in Fig. 2, thereby causing the water to be forced inward through the stone, into the space 32 and the tube, and out through the lower end of the latter.

What we claim is—

1. A filter comprising in its construction a casing containing a filtering medium and having a single outlet, and vertically-movable valve mechanism above and below the said medium and connected together, one of said valve mechanisms being adapted to close the passage through the casing and the other to direct water either through said filtering medium or around it to the outlet.

2. A filter comprising in its construction a casing containing filtering medium and having a single outlet, both the casing and the said medium being substantially acorn-shaped, and vertically-movable valve mechanism above and below the said medium and connected together, one of said valve mechanisms being adapted to close the passage through the casing and the other to direct water through or around the filtering medium to the outlet, the acorn shape of the said casing and medium serving to prevent the lodgment of sediment between them.

3. A filter comprising in its construction a casing having an inlet and a single outlet and valve-seats adjacent thereto, a perforated tube surrounded by filtering medium and having a valve near each end, and means for moving said tube longitudinally to simultaneously open one valve while closing the other.

4. A filter comprising in its construction the casing 10 having an inlet and valve-seat 23 an outlet and valve-seat 30 and the screw-threads 25, the perforated tube 14 threaded at 24 and having the valves 22 and 26 and the hand-wheel 29, and the filtering-stone 31 surrounding the tube 14 and movable therewith, substantially as described.

Signed at New York, in the county of New York and State of New York, this 2d day of May, A. D. 1895.

THEODORE LINKE.
HENRY EGBERT GOULD.

Witnesses:
MOSES K. GROSSMAN,
CHARLES S. MILLER.